US008302482B2

(12) United States Patent
Kiyama

(10) Patent No.: US 8,302,482 B2
(45) Date of Patent: Nov. 6, 2012

(54) PRESSURE SWITCH

(75) Inventor: Satoshi Kiyama, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 354 days.

(21) Appl. No.: 12/795,156

(22) Filed: Jun. 7, 2010

(65) Prior Publication Data

US 2011/0023616 A1 Feb. 3, 2011

(30) Foreign Application Priority Data

Aug. 3, 2009 (JP) ................................. 2009-180529

(51) Int. Cl.
*G01L 7/00* (2006.01)
*H01H 35/38* (2006.01)

(52) U.S. Cl. ........................................ 73/700; 200/82 R

(58) Field of Classification Search ........................ None
See application file for complete search history.

(56) References Cited

U.S. PATENT DOCUMENTS

| | | | | |
|---|---|---|---|---|
| 5,508,483 A * | 4/1996 | Czarn et al. | 200/83 J |
| 5,554,834 A * | 9/1996 | Ellett | 200/82 A |
| 5,670,766 A * | 9/1997 | Ellett | 200/83 J |
| 5,744,771 A * | 4/1998 | Ellett | 200/83 J |
| 5,872,345 A * | 2/1999 | Takahashi et al. | 200/83 J |
| 2005/0067266 A1* | 3/2005 | Amaduzzi | 200/81 R |
| 2007/0007116 A1* | 1/2007 | Heissler | 200/81 R |
| 2010/0154899 A1* | 6/2010 | Isono | 137/487.5 |
| 2012/0048710 A1* | 3/2012 | Bruchal | 200/82 R |

FOREIGN PATENT DOCUMENTS

| | | |
|---|---|---|
| JP | 64-12440 | 1/1989 |
| JP | 10-208597 | 8/1998 |
| KR | 2000-0061653 | 10/2000 |
| KR | 20-0239226 | 10/2001 |
| KR | 10-0877135 | 1/2009 |

OTHER PUBLICATIONS

Office Action issued on Sep. 28, 2011 in the corresponding Korean Patent Application No. 10-2010-0058495 (with English Translation of pertinent portion).
Office Action issued May 24, 2011, in Japanese Patent Application No. 2009-180529 with English translation of pertinent portion.
Notice of Allowance issued May 15, 2012 in Korean Application No. 10-2010-0058495 (With English Translation).

* cited by examiner

*Primary Examiner* — Andre Allen
(74) *Attorney, Agent, or Firm* — Oblon, Spivak, McClelland, Maier & Neustadt, L.L.P.

(57) ABSTRACT

A pressure switch includes a piston accommodated for sliding movement in a chamber formed in the interior of a casing and which communicates with an introduction port, a coil spring for elastically applying a force to one surface of the piston, an adjustment screw which is capable of variably adjusting an elastic force applied to the one surface, a swivel plate engaged with the adjustment screw and on which the coil spring is seated, and a pointer formed from a resin material integrally with the swivel plate for indicating a pressure of air detected by a switch unit. The adjustment screw variably stretches and compresses the coil spring by movement of the swivel plate, while also maintaining the coil spring at a position at which a predetermined elastic force is obtained. The swivel plate is colored together with the pointer in a high saturation color.

2 Claims, 5 Drawing Sheets

10

10

PRESSURE SWITCH

CROSS-REFERENCE TO RELATED APPLICATION

This application is based upon and claims the benefit of priority from Patent Application No. 2009-180529 filed on Aug. 3, 2009, in the Japan Patent Office, of which the contents are incorporated herein by reference.

BACKGROUND OF THE INVENTION

1. Field of the Invention

The present invention relates to a pressure switch that measures the pressure of a fluid.

2. Description of the Related Art

Heretofore, as a means for ensuring that various types of machines can safely be driven automatically, pressure switches have widely been used. By setting beforehand a pressure threshold on the side of a pressure switch that is connected to various devices, excessive fluid pressures generated at a location where the pressure switch is disposed are detected mechanically and/or electrically, whereupon a detection signal can be issued immediately to notify the various devices.

For example, in the case that an air filter, a regulator, a lubricator, or the like, which make up types of air pressure auxiliary devices, are interconnected mutually via metal fittings, it is often the case that pressure switches are installed on such metal fittings. In this type of situation, a pressure switch that is small in size and lightweight preferably should be used.

In Japanese Laid-Open Patent Publication No. 10-208597, a technical concept is disclosed concerning a pressure switch, which comprises an adjustment screw for setting a pressure threshold value, a swivel plate screw-engaged with the adjustment screw and which slides under a linkage with rotary movement of the adjustment screw, a movable needle formed integrally with the swivel plate, and a display window, which is disposed on a part of a casing. In greater detail, in the vicinity of both sides of the display window provided on the casing, scale markings and a row of Arabic numbers are provided, together with a pointer consisting of a line colored in red or the like on an upper surface of the movable needle, which is applied by printing or the like.

As a result of being constructed in this manner, and by displaying in combination the needle, the scale markings and the row of Arabic numbers, the preset pressure threshold can be confirmed visually from an external area outside of the casing. Accordingly, while reading the numerical values of the scale markings pointed to and indicated by the needle, an operator turns the adjustment screw, whereby the threshold value of the pressure switch can easily be set. Naturally, when measurements are performed, measured pressures are capable of being confirmed visually as well by the numerical values of the scale markings which are indicated by the pointer.

However, in the pressure switch disclosed in Japanese Laid-Open Patent Publication No. 10-208597, since it is necessary that the plane in which the display window is formed be parallel to the displacement direction of the swivel plate, the planes in which the display window and the swivel plate are formed must be mutually perpendicular to each other.

Notwithstanding, in the case that the swivel plate in the aforementioned pressure switch is constructed from a metal plate, in order to form a separate movable needle, an L-shaped bending process must be carried out. Further, in order to display the pointer, which is made up of a red line or the like on the movable needle, it is necessary to perform a process step of engraving with respect to the metal plate, and a separate process step of applying color thereto.

In this manner, in the case that a pointer is to be provided on the movable needle after the swivel plate and the movable needle have been formed integrally using a metal plate, separate processing steps, together with an increase in the number of parts, are required. Consequently, a disadvantage results in that manufacturing costs for the pressure switch are increased.

SUMMARY OF THE INVENTION

The present invention has been devised as a solution to the aforementioned problems. An object of the present invention is to provide a pressure switch for which manufacturing costs are reduced, and which does not require an increase in the number of parts for the pressure switch.

The present invention is characterized by a pressure switch, including a casing equipped with an introduction port for enabling a fluid to be introduced therein, a piston accommodated for sliding movement in a chamber which is formed in the interior of the casing and which communicates with the introduction port, an elastic member for elastically applying a force to one surface of the piston, an elasticity adjusting means which is capable of variably adjusting an elastic force applied by the elastic member to the one surface, a swivel plate which is engaged with the elasticity adjusting means and on which the elastic member is seated, and a detecting means for detecting a pressure of the fluid based on displacement of the piston upon receiving the pressure from the fluid introduced and directed from the introduction port. The pressure switch further comprises a pointer formed from a resin material integrally with the swivel plate for indicating a threshold value of the pressure of the fluid detected by the detecting means. The elasticity adjusting means variably stretches and compresses the elastic member by movement of the swivel plate, while also maintaining the elastic member at a position at which a predetermined elastic force is obtained. The swivel plate is colored together with the pointer in a high saturation color.

With the pressure switch of the present invention, because the swivel plate is provided which is formed from a resin material integrally with the pointer thereof, after resin molding of the swivel plate, a separate forming process in order to provide a pointer is not needed. Therefore, the manufacturing costs for the pressure switch can be reduced, and the swivel plate and pointer can be completed without increasing the number of parts. Further, because the resin material is colored with a high saturation color, contrast with the casing, which is dark in the interior thereof, can be made more clear, so that visual confirmation by an operator of the value indicated by the pointer is made easier.

Further, a distal end of the pointer preferably extends from a seat of the swivel plate and is sharpened in a direction facing toward a display window disposed in the casing.

Because a pointer is provided having a distal end that extends from the seat of the swivel plate and which is sharpened in a direction facing toward the display window, the indicated portion by the pointer becomes clear and an operator can more easily read the indicated value.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
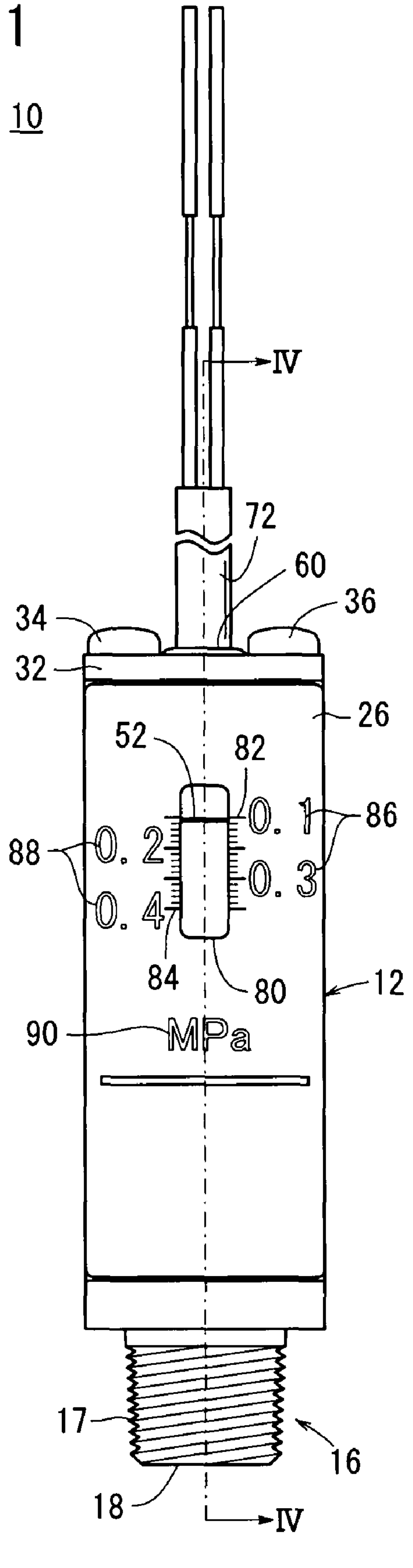
FIG. 1 is a front view of a pressure switch according to an embodiment of the present invention.
Figure 2:
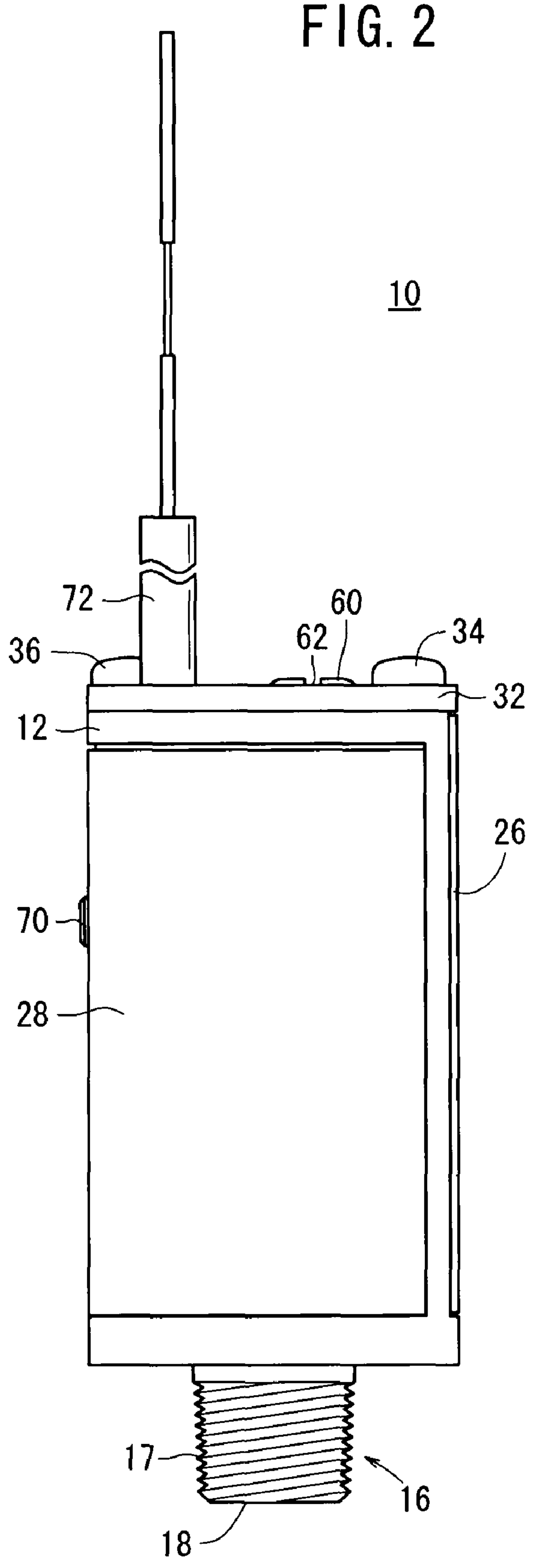
FIG. 2 is a left side view of the pressure switch according to the present embodiment.
Figure 3:
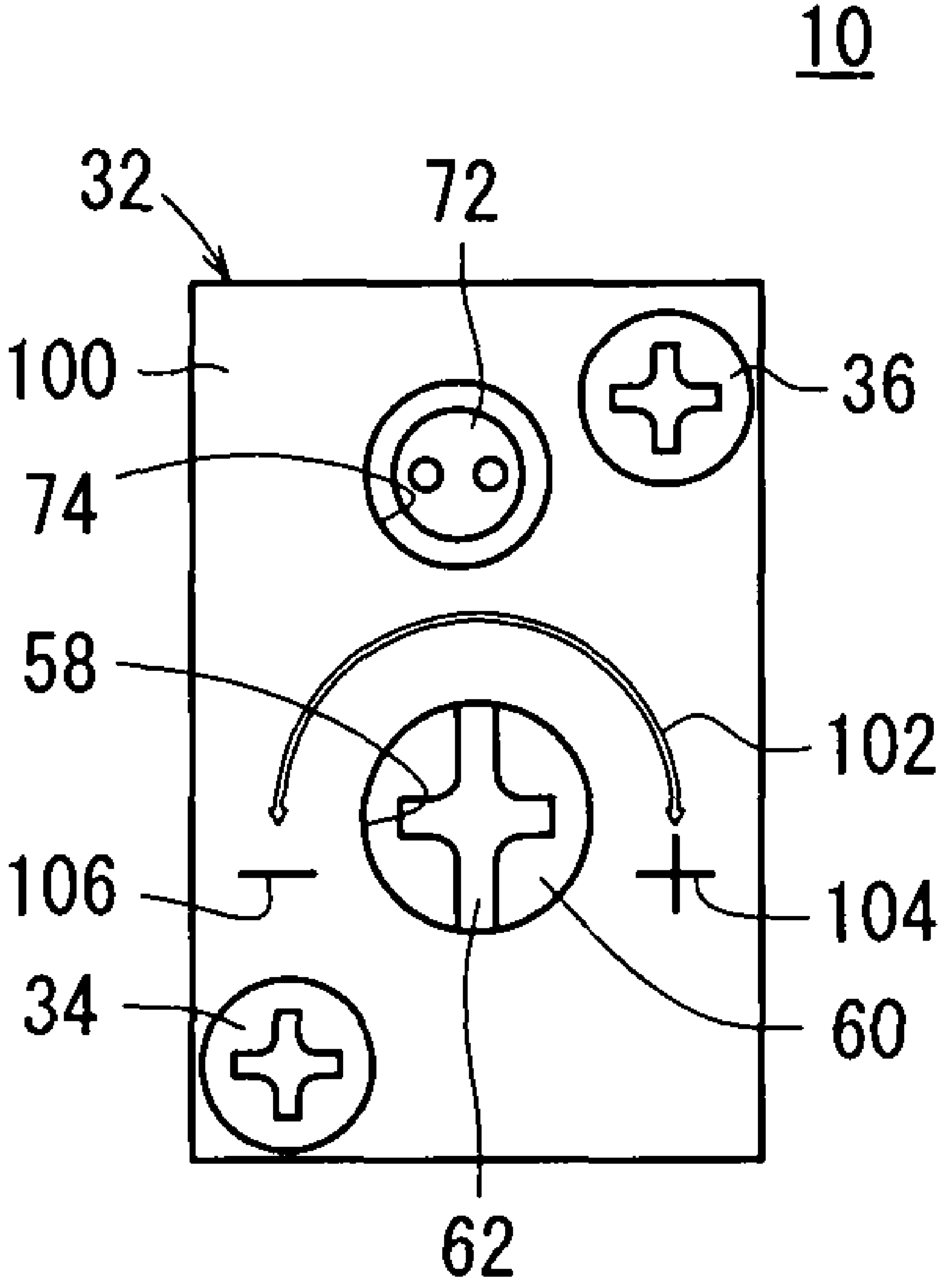
FIG. 3 is a plan view of the pressure switch according to the present embodiment.
Figure 4:
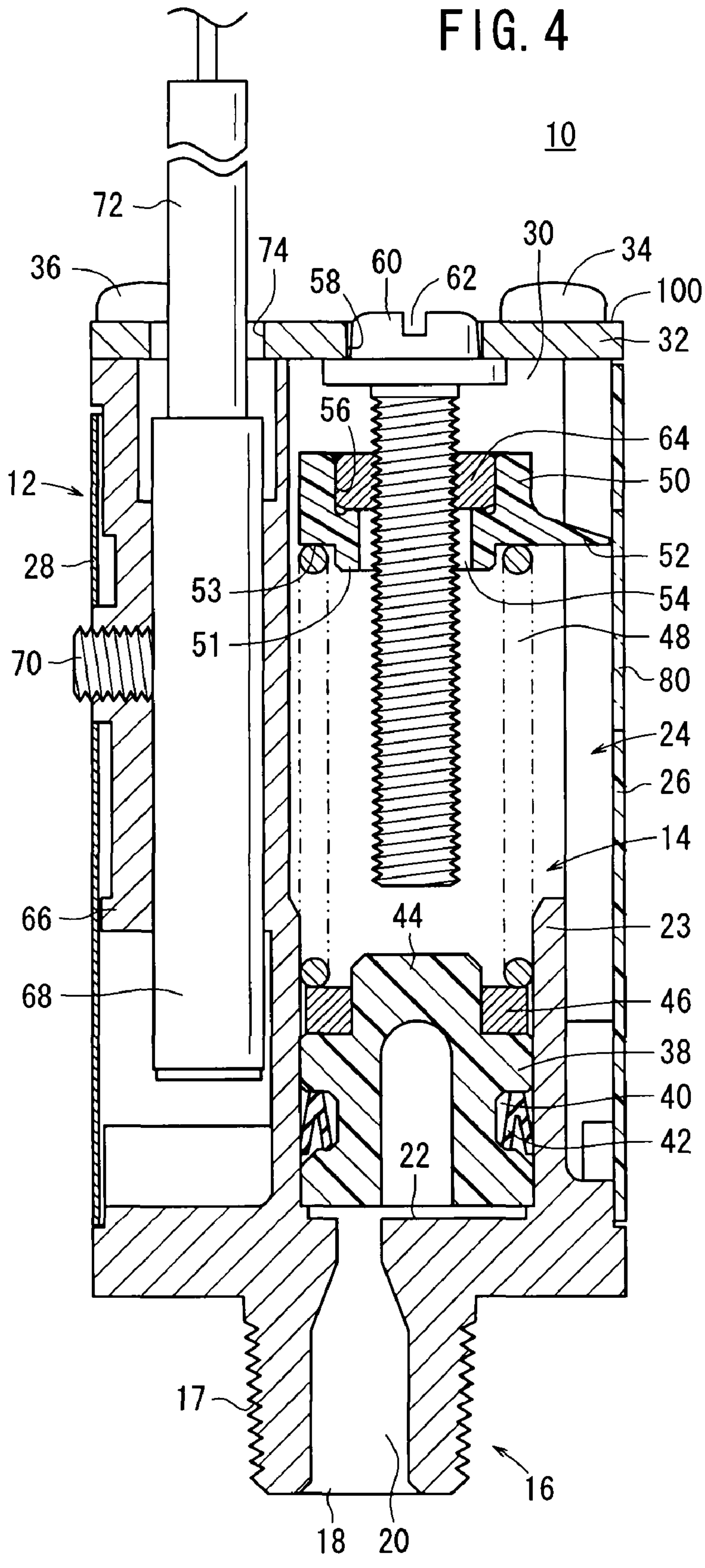
FIG. 4 is an enlarged cross sectional view, partially omitted, taken along line IV-IV of FIG. 1.

FIG. 1 is a front view of a pressure switch according to an embodiment of the present invention, FIG. 2 is a left side view, and FIG. 3 is a plan view thereof. FIG. 4 is an enlarged cross sectional view, partially omitted, taken along line IV-IV of FIG. 1.

As shown in FIG. 4, a pressure switch 10 includes a casing 12, which is formed from a metal material substantially in the shape of a rectangular parallelepiped. A chamber 14 is formed in the interior of the casing 12.

The casing 12 has a coupling 16 formed integrally on a lower part thereof. On an outer peripheral edge of the coupling 16, a male screw 17 is formed, which is connectable with a later-described attachment fitting. A cylindrical introduction port 18 is disposed on a bottom surface part of the coupling 16. The introduction port 18 communicates with one end of a communication passage 20, which is gradually reduced in diameter via a stepped portion from a lower part to an upper part thereof. The introduction port 18 and the chamber 14 in the interior of the casing 12 communicate with each other via the communication passage 20. The other end of the communication passage 20 terminates at an inner bottom wall surface 22 of the chamber 14.

A cylinder main body 23 is formed integrally with the coupling 16 in the interior of the casing 12. One part thereof extends upwardly as shown in FIG. 4 and functions as a switch holder 66, as will be described later.

A rectangular shaped cutout portion 24, which extends longitudinally from an upper portion to a downward portion, is provided on a front surface of the casing 12. A resin-manufactured faceplate 26 having predetermined printing thereon is adhered to the casing 12 so as to cover the cutout portion 24.

On both sides thereof and on the rear of the casing 12, a shield plate 28, which is made from a rolled steel plate, is attached (see FIG. 2).

The upper surface of the casing 12 includes a large rectangular shaped opening 30. The opening 30 is covered and sealed by a flat plate shaped cover 32, which has substantially the same area as the opening 30. Two diagonally opposed stop screws 34, 36 are disposed in non-illustrated through holes on the cover 32 through which the stop screws 34, 36 are insertable (see FIG. 3), whereby the casing 12 and the cover 32 are integrally assembled by means of the two stop screws 34, 36.

On the inner bottom wall surface 22 on the front face side of the chamber 14 formed in the casing 12, a cylindrical column shaped piston 38 that extends in the longitudinal direction of the casing 12 is slidably accommodated. The piston 38 preferably is constructed from a lightweight polyacetal resin having a low coefficient of friction. An annular groove 40 is disposed centrally around the side surface of the piston 38, and an annular shaped Y-packing 42 is fitted into the groove 40. Further, on an upper surface of the piston 38, a cylindrical columnar shaped projection 44 is disposed coaxially with the piston 38. An annular magnet 46 is fitted over the projection 44.

A lower end of a coil spring 48, which serves as an elastic member, is affixed coaxially on an upper surface of the magnet 46. The coil spring 48 has an annular form and is of substantially the same diameter as that of an annular form of the magnet 46.

A swivel plate 50, which is substantially tubular shaped in outline, is mounted at the upper end of the coil spring 48. The swivel plate 50 is constructed from a resin material, which is colored in red. A cylindrical bulging portion 51 is formed on a lower part of the swivel plate 50, and the periphery of the bulging portion 51 constitutes a seat 53 for the coil spring 48.

Together with the swivel plate 50 constructed in this manner, a pointer 52 is formed integrally therewith. The distal end of the pointer 52 is formed by a thin sharpened flat plate, which extends from the seat 53 in a direction perpendicular to the longitudinal direction of the casing 12. The distal end of the pointer 52 faces toward the opening of the faceplate 26.

A round hole 54, which is narrow in diameter along the axial direction, is disposed on a lower part of the swivel plate 50. The round hole 54 communicates with a hexagonal recess 56, the opening area of which is larger than the round hole 54, and which is provided on an upper part of the swivel plate 50.

On the other hand, a screw hole 58 is provided roughly in the center of the cover 32. An adjustment screw (elasticity adjusting means) 60 is inserted through the screw hole 58, being directed into the chamber 14. The upper end face of the adjustment screw 60 is exposed through the screw hole 58, with cross-shaped grooves 62 (see FIG. 3) being engraved into the upper end face thereof.

Further, the adjustment screw 60 is screw-engaged with a hexagonal nut 64, which is seated in the recess 56.

Also, the adjustment screw 60 penetrates into the inner side of the coil spring 48, such that the end portion of the adjustment screw 60 confronts, with a given distance therebetween, the projection 44 of the piston 38.

On the back surface side of the chamber 14 formed in the casing 12, the cylindrical switch holder 66 is disposed in the casing 12, and more specifically, is disposed integrally with the cylinder main body 23. A columnar shaped switch unit (detecting means) 68 is accommodated in a hole that extends in the axial direction of the casing 12 of the switch holder 66. The switch unit 68 is affixed to the switch holder 66 by a stop screw 70, which is inserted through the shield plate 28 and the casing 12. In this case, a non-illustrated reed switch is mounted inside the switch unit 68, and two ferromagnetic reeds, which make up the reed switch, normally are in a switched OFF state with a predetermined contact spacing therebetween (i.e., the contacts thereof are in an open state).

Lead lines 72 are electrically connected to the switch unit 68 for the purpose of externally outputting detection signals therefrom. The lead lines 72 are drawn out externally from the pressure switch 10 via a through hole 74, which is formed in the cover 32.

Opposite from the location where the switch unit 68 is attached inside the casing 12, the faceplate 26 (and a later-described display window 80) are disposed.

As shown in FIG. 1, in au upper central region of the faceplate 26, which is disposed roughly over the entire surface of the front of the pressure switch 10, there are provided the display window 80 having a vertical rectangular shape with rounded corners, scale markings 82, 84 on both left and right sides of the display window 80, two rows of Arabic numbers 86, 88 that correspond to positions of the scale markings 82, 84, and an alphabet row 90 that reads "MPa" at a lower side position of the display window 80.

The display window 80 is light permeable, being either transparent or semitransparent, whereas the pointer 52, which is disposed inside the chamber 14 of the casing 12, is arranged at a position to enable visual confirmation thereof from the exterior front surface of the pressure switch 10.

Further, the scale markings 82, 84 are made up of four long lines disposed at positions corresponding to the rows of Arabic numbers 86, 88, and four short lines disposed at positions that divide the intervals between adjacent long lines into five equal intervals.

As shown in FIG. 3, substantially in the center of the cover 32, the upper surface part of the adjustment screw 60 (having a round shape in planar view) is exposed. On the upper surface 100 of the cover 32, with respect to the position of the adjustment screw 60, there are engraved, respectively, a curved arrow 102 that runs along the outer circumference of the adjustment screw 60 on an upper portion thereof, with a plus ("+") sign 104 on the righthand side, and a minus ("–") sign 106 on the lefthand side thereof.

Figure 5B:
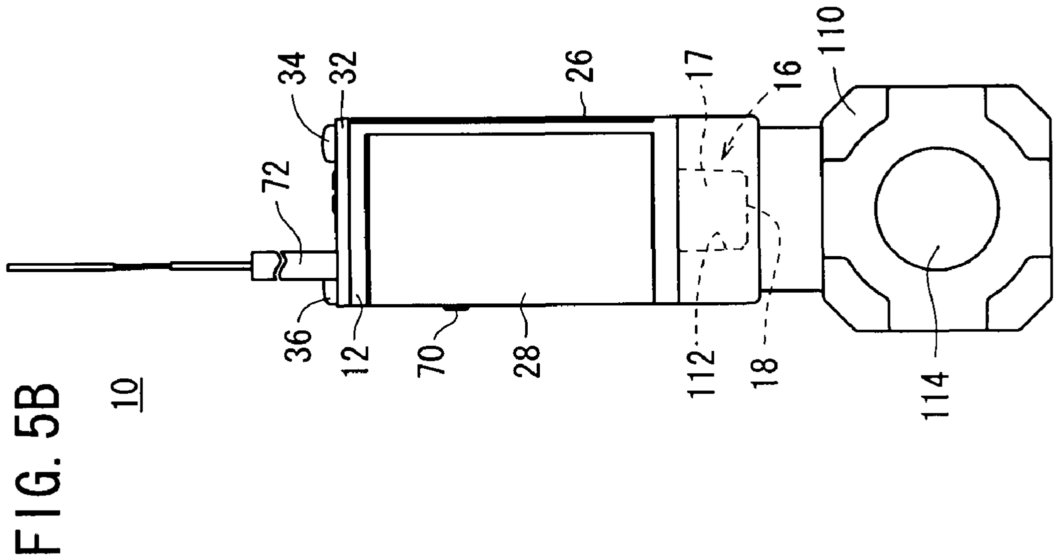
FIG. 5B is a left side view showing a condition in which an attachment fitting is screw-connected with the pressure switch shown in FIG. 1.
Figure 5A:
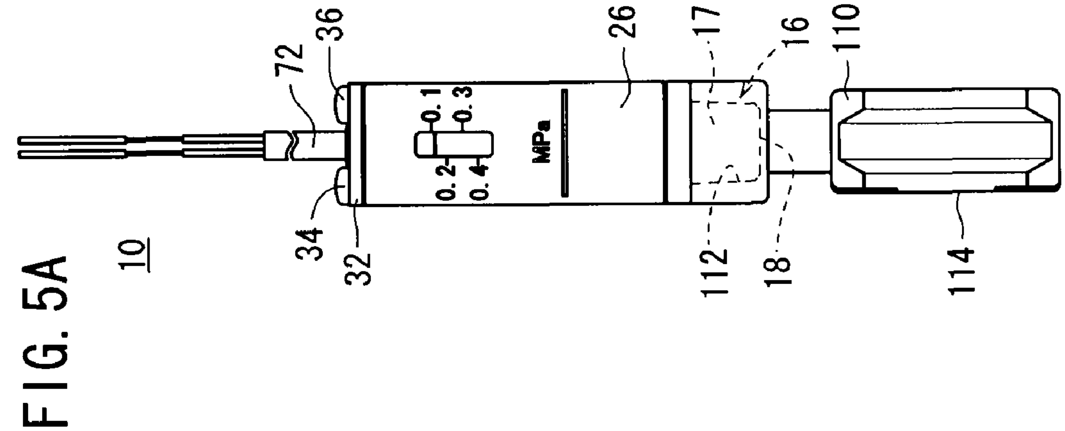
FIG. 5A is a front view showing a condition in which an attachment fitting is screw-connected with the pressure switch shown in FIG. 1.

Next, and explanation shall be made of a configuration in which an attachment fitting is screw-connected with the pressure switch 10 according to the present embodiment. FIG. 5A is a front view showing a condition in which the attachment fitting is screw-connected with the pressure switch 10 shown in FIG. 1, whereas FIG. 5B is a left side view showing a condition in which the attachment fitting is screw-connected with the pressure switch 10 shown in FIG. 1.

Female screw threads 112 are provided in an upper side inner wall of an attachment fitting 110. The female screw threads 112 are screw-engaged with the male screw 17 on the side of the pressure switch 10. A hollow fluid passage 114 is disposed in the center of the attachment fitting 110. The fluid passage 114 communicates with the communication passage 20 via the introduction port 18, which is disposed in the coupling 16.

The pressure switch 10 according to the present embodiment is basically constructed as described above. Next, operations and advantages of the pressure switch 10 shall be explained with reference primarily to FIG. 4.

First, an operator performs an operation to set the pressure threshold for the fluid in the pressure switch 10. In this case, the operator engages a non-illustrated plus-driver (i.e., a screw driver having a "+" shape) in the cross-shaped grooves 62 on the upper end surface of the adjustment screw 60 that is inserted through the cover 32, and performs a turning operation to rotate the adjustment screw 60.

When the adjustment screw 60 is rotated clockwise (toward the side of the plus sign 104) in the direction of the arrow 102 (see FIG. 3), the swivel plate 50, which is screw-engaged with the adjustment screw 60 and is integral with the nut 64 engaged in the recess 56 of the swivel plate 50, is caused to move downward, thereby compressing the coil spring 48 against the elasticity thereof, whereby the distance between the piston 38 and the swivel plate 50 is made shorter. In this manner, because the coil spring 48 is caused to contract, the elastic force imposed on the piston 38 increases.

On the other hand, when the adjustment screw 60 is rotated counterclockwise (toward the side of the minus sign 106) in the direction of the arrow 102 (see FIG. 3), the swivel plate 50, which is screw-engaged with the adjustment screw 60 and is integral with the nut 64 engaged in the recess 56 of the swivel plate 50, is caused to move upward, thereby gradually releasing the pressing force on the coil spring 48, so that the distance between the piston 38 and the swivel plate 50 is made longer. In this manner, because the coil spring 48 is made to expand, the elastic force imposed on the piston 38 decreases.

As shown in FIG. 1, the display window 80 of the faceplate 26 is transparent. The region of the display window 80 is contained within a region of the cutout portion 24 (see FIG. 4) at the front of the casing 12. Accordingly, when an operator views the front surface from the exterior of the pressure switch 10, the pointer 52, which is disposed in the interior of the casing 12, can be perceived visually. The pointer 52 is formed integrally with the swivel plate 50, which is made of a resin material, and has a sharpened flat plate shape. Therefore, a fluid pressure threshold value (set value) which corresponds to the displacement amount of the coil spring 48 is displayed in an analog manner through the display window 80.

More specifically, an operator is capable of reading, through a combination of the scale markings 82, 84, the rows of Arabic numbers 86, 88 and the alphabet row 90, a range of 0.1 to 0.4 MPa, at intervals of 0.02 MPa (megapascals).

After resin molding of the swivel plate 50 is completed, a separate forming process in order to provide the pointer 52 is not needed. Therefore, the manufacturing costs for the pressure switch 10 can be reduced, and the swivel plate 50 and pointer 52 can be completed without increasing the number of parts.

Further, because the swivel plate 50 is colored with a high saturation color, for example in red, contrast with the casing 12, which is dark in the interior thereof, can be made more clear, so that confirmation by an operator of the value indicated by the pointer 52 is made easier. Saturation is defined as a scale or measure of brightness exhibited by a mixing ratio of white, black, and a primary color. Colors having high saturation (high saturation colors) are defined as colors for which the mixing ratio of the primary color therein is high, and are not limited to the aforementioned red. It goes without saying that colors of green and blue, etc., may also be used.

Furthermore, since the distal end of the pointer 52 that confronts the faceplate 26 on the casing 12 is tapered or sharpened, an operator can easily read the numerical value indicated by the pointer 52. In particular, if a sharp-pointed flat plate is used, as is preferable, the indicated value can be confirmed more assuredly.

Still further, since the pointer 52 consists of a sharpened flat plate, the pointer 52 possesses depth perspective with respect to the direction in which the operator visually perceives the pointer 52. Consequently, even if the display window 80 is visualized from the front of the casing 12 at an angle in the vertical direction (i.e., in the longitudinal direction of the casing 12), deterioration of visual perception of the pointer 52 can be prevented.

In this manner, after the fluid pressure threshold has been set, the attachment fitting 110 is connected to a non-illustrated device. Upon doing so, for example, compressed air, which is blown out from an air filter, a regulator, a lubricator or the like, which make up types of air pressure auxiliary devices, is enabled to flow through the fluid passage 114 of the attachment fitting 110.

A portion of the air, which forms the fluid that flows through the fluid passage 114, is introduced into the interior of the chamber 14 of the pressure switch 10 through the introduction port 18 and the communication passage 20. Because the end of the communication passage 20 communicates with the inner bottom wall surface 22 of the chamber 14, the lower surface of the piston 38 receives the pressure of the air.

When air having a pressure that exceeds the set value set by the adjustment screw 60 is introduced into the chamber 14, because the piston 38 is made to slide and is displaced upwardly against the elasticity of the coil spring 48, the magnet 46, which is fitted onto the projection 44 of the piston 38, also is displaced upwardly in unison with the piston 38. When this happens, accompanying the magnet 46 coming into proximity thereof, the two ferromagnetic reeds (not shown) of the switch unit 68 are made to contact each other (i.e., the contacts thereof are placed in a closed state), and the non-illustrated reed switch is switched ON. Thereafter, a detection signal is transmitted externally through the lead lines 72 from the switch unit 68. As shown in FIG. 2, both side surfaces as well as the back surface of the casing 12, that is, in the vicinity of the disposed position of the switch unit 68, the shield plate 28 is provided. Consequently, the influence of external electromagnetic waves can be reduced and faulty operation of the pressure switch 10 can be prevented.

In the event that the pressure threshold set by the adjustment screw 60 is high, the elastic force from the coil spring 48 increases, and therefore the air pressure required to displace the piston 38 is made larger. Conversely, in the event that the pressure threshold set by the adjustment screw 60 is low, the elastic force from the coil spring 48 decreases, and therefore the air pressure required to displace the piston 38 is made smaller.

In this manner, with the pressure switch 10 according to the present embodiment, excessive fluid pressure, such as air pressure or the like, can be detected, whereupon a detection signal can be issued immediately as a notification to the exterior (i.e., to the side of various devices).

The pressure switch 10 according to the present invention is not limited to the above-described embodiment, and it is a matter of course that various modified or additional structures could be adopted without deviating from the essence and gist of the invention.

For example, if a structure is adopted in which the casing 12 and the coupling 16 are formed as an integral unit, the number of parts and assembly steps can be reduced, thus lowering the rate of assembly defects. Consequently, the manufacturing costs for the pressure switch 10 can be even further reduced.

Further, if a structure is adopted in which the internal parts can be accommodated in an integral manner from the opening 30 of the casing 12 upon removing the cover 32 of the pressure switch 10, the number of assembly steps also can be reduced. As a result, the manufacturing costs for the pressure switch 10 can be further reduced. In this case, the concerned internal parts are made up, for example, of the magnet 46, the coil spring 48, the swivel plate 50, the adjustment screw 60 and the nut 64.

Moreover, although in the present embodiment, a case has been described in which the fluid was air, the invention is not limited by this feature, and the invention is applicable for use with various types of liquids and gases.

Furthermore, in the present embodiment, although for the switch unit 68, a kind of contact type cylinder switch was used, the switching technique is not limited solely to this type. For example, a non-contact type of piston sensor could also be used.

What is claimed is:

1. A pressure switch comprising:

a casing equipped with an introduction port for enabling a fluid to be introduced therein;

a piston accommodated for sliding movement in a chamber which is formed in the interior of the casing and which communicates with the introduction port;

an elastic member for elastically applying a force to one surface of the piston;

an elasticity adjusting means for variably adjusting an elastic force applied by the elastic member to the one surface;

a swivel plate which is engaged with the elasticity adjusting means and on which the elastic member is seated; and a detecting means for detecting a pressure of the fluid based on displacement of the piston upon receiving the pressure from the fluid introduced and directed from the introduction port, the pressure switch further comprising a pointer formed from a resin material integrally with the swivel plate, for indicating a threshold value of the pressure of the fluid detected by the detecting means, wherein the elasticity adjusting means variably stretches and compresses the elastic member by movement of the swivel plate, and maintains the elastic member at a position at which a predetermined elastic force is obtained, and wherein the swivel plate is colored together with the pointer in a high saturation color.

2. The pressure switch according to claim 1, wherein a distal end of the pointer extends from a seat of the swivel plate and is sharpened in a direction facing toward a display window disposed in the casing.

* * * * *